(12) United States Patent
Ben-Ezra et al.

(10) Patent No.: US 7,836,185 B2
(45) Date of Patent: Nov. 16, 2010

(54) COMMON RESOURCE MANAGEMENT IN A SERVER CLUSTER

(75) Inventors: Asaf Ben-Ezra, Acco (IL); Olga Berezin, Yokneam Ilit (IL); Haim Schneider, Ramot Meir (IL); Uri Segev, Or-Yehuda (IL); Ofira Tal-Aviv, Moshav Bitzaron (IL); Asaf Zinger, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/163,436

(22) Filed: Jun. 27, 2008

(65) Prior Publication Data

US 2009/0327494 A1 Dec. 31, 2009

(51) Int. Cl.
*G06F 15/173* (2006.01)
(52) U.S. Cl. ............... 709/226; 709/202; 709/206; 709/213; 709/219; 709/229; 709/235; 709/241
(58) Field of Classification Search ............... 709/202, 709/203, 213, 219, 226, 229, 235, 241
See application file for complete search history.

(56) References Cited

U.S. PATENT DOCUMENTS

| | | | | |
|---|---|---|---|---|
| 6,038,651 | A * | 3/2000 | VanHuben et al. | 712/21 |
| 6,807,580 | B2 * | 10/2004 | Freeman et al. | 709/249 |
| 6,954,456 | B2 * | 10/2005 | Cranor et al. | 370/356 |
| 7,020,129 | B2 | 3/2006 | Coffey et al. | |
| 7,103,644 | B1 * | 9/2006 | Zhang et al. | 709/219 |
| 7,289,441 | B1 * | 10/2007 | Barach | 370/230 |
| 7,466,810 | B1 * | 12/2008 | Quon et al. | 379/201.01 |
| 7,516,221 | B2 * | 4/2009 | Souder et al. | 709/226 |
| 2003/0217142 | A1 | 11/2003 | Bobde et al. | |
| 2004/0258239 | A1 | 12/2004 | Gallant et al. | |
| 2005/0009520 | A1 | 1/2005 | Herrero et al. | |
| 2006/0230149 | A1 * | 10/2006 | Jackson | 709/226 |

OTHER PUBLICATIONS

Edward Bortnikov, et al.; "Scalable Real-Time Gateway Assignment in Mobile Mesh Networks"; Department of Electrical Engineering, The Technion, Israel Institute of Technology; CoNEXT '07; Dec. 10-13, 2007.

* cited by examiner

*Primary Examiner*—Michael Won
(74) *Attorney, Agent, or Firm*—Sughrue Mion, PLLC (57) ABSTRACT

A system for assigned resource management, including multiple computer servers, each identifiable by an identifier, and a resource table stored on a computer-readable data storage medium and accessible to any of the servers, where any of the servers is configured to establish itself as manager for a resource, if no record in the resource table indicates that a manager exists for the resource, by including its identifier in a record in the resource table for the resource in a manner that indicates that the server is manager for the resource, where any of the servers is configured to include its identifier in a list of servers in the record for the resource that wish to participate in the performance by the manager of at least one action regarding the resource, and where the manager is configured to perform the action regarding the resource.

26 Claims, 9 Drawing Sheets

COMMON RESOURCE MANAGEMENT IN A SERVER CLUSTER

FIELD OF THE INVENTION

The present invention relates to server cluster architecture in general, and more particularly to managing common resources in a server cluster.

BACKGROUND OF THE INVENTION

In distributed SIP/SIMPLE server applications server clusters are used to manage network loading problems by utilizing mechanisms such as load balancing, where new subscription requests are distributed equitably among the servers in the cluster. However, a situation may arise where multiple subscriptions are maintained by different servers within a server cluster for the same resource, resulting in certain inefficiencies. For example, each server that maintains a subscription for a resource's presence information will typically subscribe to receive the resource's presence authorization rules from a presence rule server in order to keep up with any changes that occur within the presence authorization rules during the life of the subscription. Thus, where multiple subscriptions are maintained by different servers within a server cluster for the same resource, each of these servers will maintain separate subscriptions to the same presence authorization rules, thus creating a heavy load on the presence rules server due to the computing resources needed for maintaining each separate subscription. Whenever there's a change in the presence rules, the presence rules server must send the same change notification message to each of the servers that have a subscription to receive the rules, resulting in increased network load and processing load. Each of these servers also allocates resources for maintaining retrieved copies of presence authorization rules, incurring the additional cost of managing multiple subscriptions.

SUMMARY OF THE INVENTION

The present invention in embodiments thereof discloses novel systems and methods for managing shared resources in a server cluster.

In one aspect of the present invention a system is provided for assigned resource management, the system including a plurality of computer servers, each identifiable by an identifier, and a resource table stored on a computer-readable data storage medium and accessible to any of the servers, where any of the servers is configured to establish itself as manager for a resource, if no record in the resource table indicates that a manager exists for the resource, by including its identifier in a record in the resource table for the resource in a manner that indicates that the server is manager for the resource, where any of the servers is configured to include its identifier in a list of servers in the record for the resource that wish to participate in the performance by the manager of at least one action regarding the resource, and where the manager is configured to perform the action regarding the resource, thereby obviating the performance of the action by any other of the servers identified in the list.

In another aspect of the present invention the manager is configured to create the record for the resource in the resource table if a record does not exist for the resource in the resource table.

In another aspect of the present invention any of the servers is configured to include its identifier in the list of servers in the record for the resource that wish to participate in the performance by the manager of the at least one action regarding the resource where the server maintains at least one received client subscription for information regarding the resource.

In another aspect of the present invention any of the servers is configured to maintain a list of the resources for which it is currently maintaining received client subscriptions.

In another aspect of the present invention any of the servers is configured to maintain a resource counter for the resource that the server increments each time a new session is created for a received client subscription to the resource and decrements each time a session is terminated for a received client subscription to the resource.

In another aspect of the present invention the record includes a field identifying the resource, a field identifying the manager, and a field identifying the servers that wish to participate in the performance by the manager of the at least one action regarding the resource.

In another aspect of the present invention any of the servers is configured to create a SIP application session for each resource in which it has an interest and deletes the session when it no longer has an interest in the resource.

In another aspect of the present invention the application session includes an attribute that identifies a resource for which the session was created, an attribute that identifies the server that created the session, and an attribute that indicates whether the server that created the session is designated as manager for the resource.

In another aspect of the present invention the action is the retrieval of information regarding the resource.

In another aspect of the present invention the manager provides the information to any of the servers identified in the list.

In another aspect of the present invention the manager writes the information to a computer-readable data storage medium that is accessible to any of the servers identified in the list.

In another aspect of the present invention the manager is configured to cease acting as manager for the resource and remove the record from the resource table when the list of servers is empty.

In another aspect of the present invention any of the servers is configured to remove itself from the list if the server maintains no subscriptions for information regarding the resource and, if the list is empty, send a message to the manager notifying the manager that there are no longer servers interested in the resource.

In another aspect of the present invention any of the servers that is not manager of the resource is configured to establish itself as manager for the resource during failover of the manager by replacing the identifier of the manager in the record with its own identifier.

In another aspect of the present invention a method is provided for assigned resource management, the method including establishing a computer server from among a plurality of computer servers as manager for a resource, if no record in a resource table indicates that a manager exists for the resource, by including an identifier of the server in a record in the resource table for the resource in a manner that indicates that the server is manager for the resource, including an identifier of any of the servers in a list of servers in the record for the resource that wish to participate in the performance by the manager of at least one action regarding the resource, and the manager performing the action regarding the resource, thereby obviating the performance of the action by any other of the servers identified in the list.

In another aspect of the present invention a computer-implemented program is provided embodied on a computer-readable medium, the computer program including a code segment operative to establish a computer server from among a plurality of computer servers as manager for a resource, if no record in a resource table indicates that a manager exists for the resource, by including an identifier of the server in a record in the resource table for the resource in a manner that indicates that the server is manager for the resource, a code segment operative to include an identifier of any of the servers in a list of servers in the record for the resource that wish to participate in the performance by the manager of at least one action regarding the resource, and a code segment operative to performing the action at the manager regarding the resource, thereby obviating the performance of the action by any other of the servers identified in the list.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
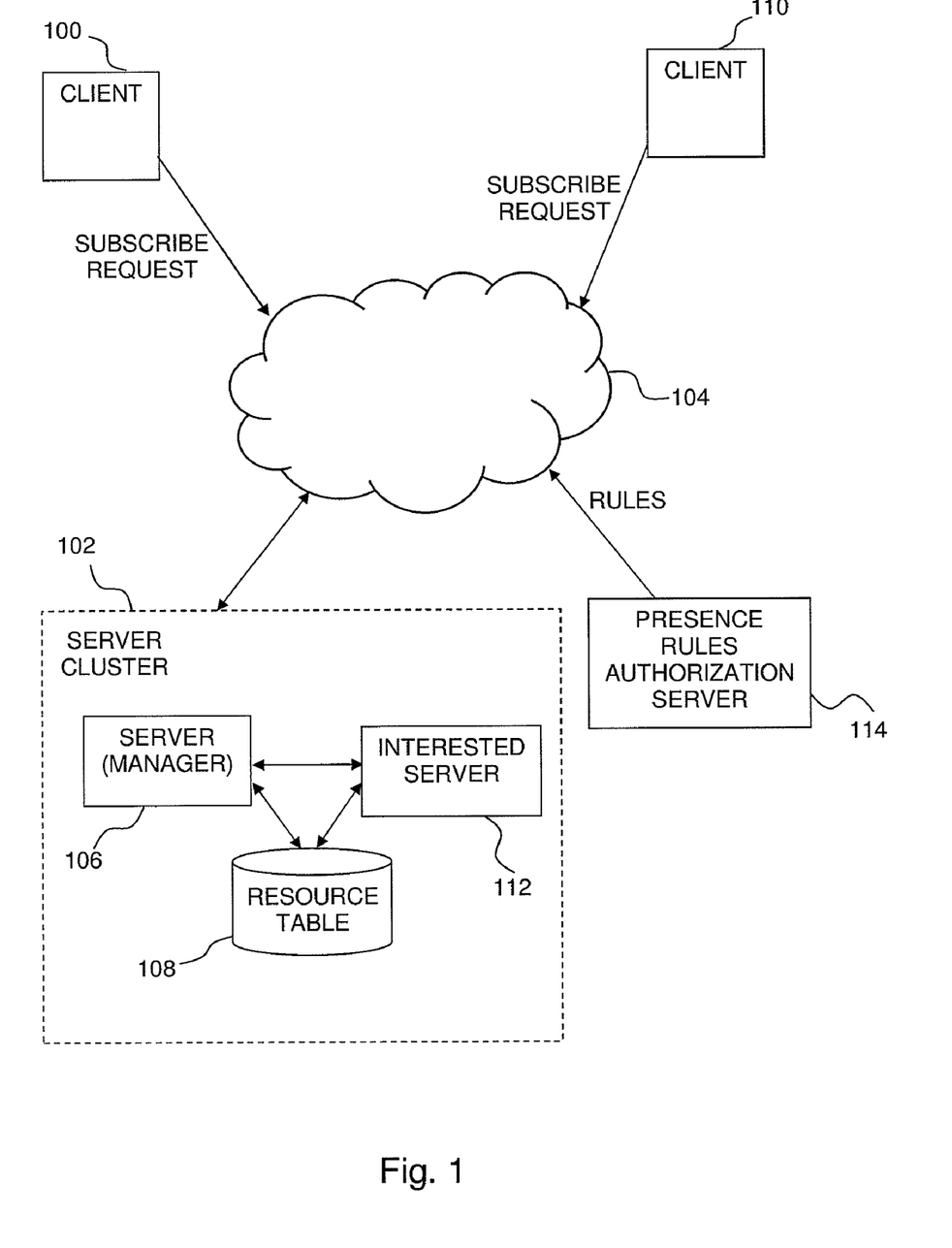
FIGS. 1, 3, and 5 are simplified conceptual illustrations of a system with an assigned resource manager, constructed and operative in accordance with an embodiment of the present invention.
Figure 2A:
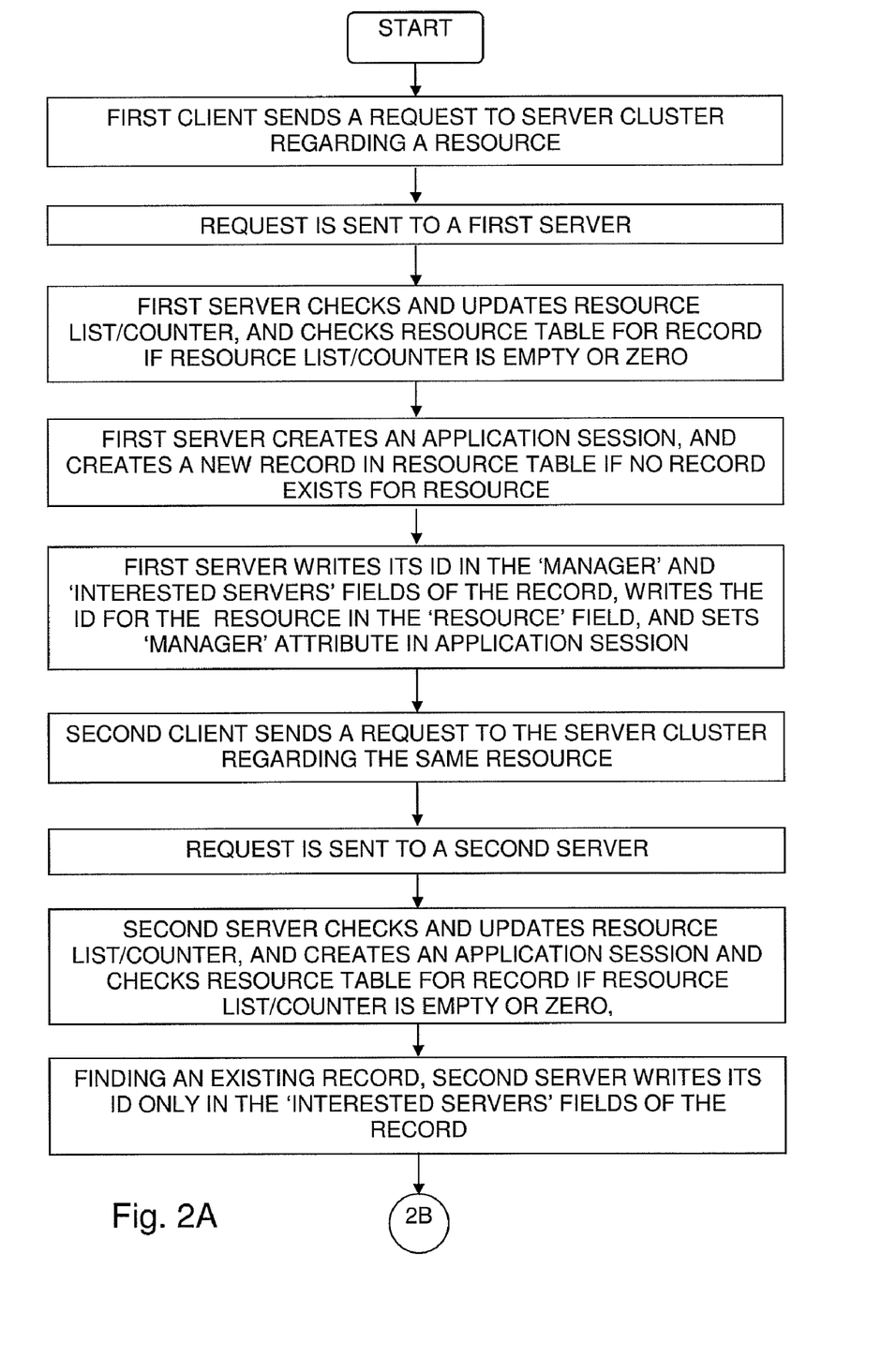
FIGS. 2A-2B, taken together, is a simplified flowchart illustration of an exemplary method of operation of the system of FIGS. 1, 3, and 5, operative in accordance with an embodiment of the present invention.
Figure 2B:
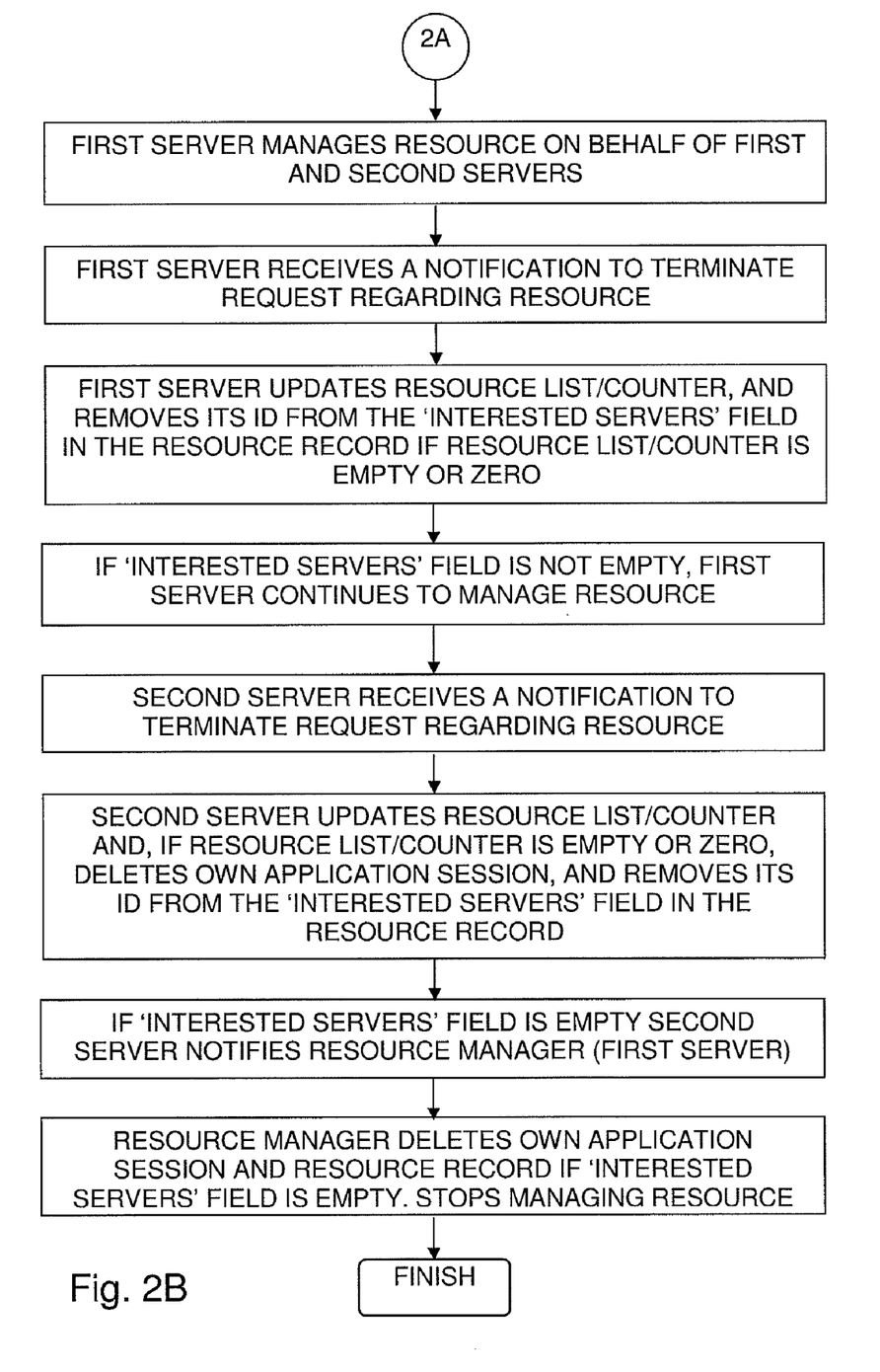

Reference is now made to FIG. 1 which is a simplified conceptual illustration of a system with an assigned resource manager, constructed and operative in accordance with an embodiment of the present invention, and additionally to FIGS. 2A-2B, which are simplified flowchart illustrations of an exemplary method of operation of the system of FIG. 1, operative in accordance with an embodiment of the present invention.

The system of FIG. 1 may be appreciated in the context of the following exemplary operational scenario in which a client 100, being any computing device, creates a SIP session or dialog by sending a SUBSCRIBE request for information regarding a resource to a cluster 102 of computer servers via a network 104. Using conventional server cluster management techniques, the request is assigned to a server 106 within cluster 102. Upon receiving the request, server 106 preferably checks whether it is already maintaining any other subscriptions for the resource using any known method, such as by checking a resource list that server 106 maintains of the resources for which it is maintaining subscriptions in active SIP sessions, or by checking a resource counter that server 106 maintains for each resource, where server 106 increments a resource's counter each time a new session is created for a subscription to that resource. If server 106 is already maintaining a subscription for the resource, server 106 updates its resource lists and/or counters as necessary. If server 106 is not yet maintaining a subscription for the resource, server 106 preferably updates its resource lists and/or counters as necessary and checks a resource table 108, table 108 being stored on any suitable computer-readable data storage medium, to see if a record exists for the resource. If a record does not exist for the resource, server 106 creates a new record for the resource in table 108, where the record preferably includes at least three fields: a 'resource' field, a 'manager' field, and an 'interested servers' field. Having created the resource record, server 106 preferably nominates itself as the resource manager for the resource, writes an identifier identifying server 106 into the 'manager' field. Additionally, server 106 preferably writes the identifier for server 106 into the 'interested servers' field which lists the identifiers of any servers in the cluster 102 that wish to participate in the performance by a single manager of one or more actions regarding the resource, and writes an identifier identifying the resource into the 'resource' field.

Server 106 also preferably creates one SIP application session for each resource in which it has an interest (e.g., for which it is maintaining a subscription), and deletes the session when it no longer has an interest in that resource. The attributes stored in the application session are typically a resource ID and type, the server ID, and an "is managing" or otherwise named flag indicating whether the server is the managing server for the resource as described above. The "is managing" flag is thus set to indicate that server 106 is the managing server for the resource.

A client 110, being any computing device, subsequently creates a SIP session by sending a SUBSCRIBE request for information regarding the same resource as that of client 100's subscription to cluster 102 via network 104. Using conventional server cluster management techniques, the request is assigned to a server 112. As described above for server 106, server 112 preferably determines whether it is already maintaining any other subscriptions for the resource. If server 112 is already maintaining a subscription for the resource, server 112 preferably updates its resource lists and/ or counters as necessary. If server 112 is not yet maintaining a subscription for the resource, server 112 preferably updates its resource lists and/or counters as necessary and checks a resource table 108 to see if a record exists for the resource. Upon finding the record for the resource that was previously created by server 106, and as the record already indicates that server 106 is currently managing the resource, server 112 simply adds an identifier identifying server 112 to the 'interested servers' field of the existing record. It is noted that upon writing to table 108, the servers within cluster 102 preferably use conventional database locking techniques to avoid race conditions.

Server 112 also preferably creates one SIP application session for each resource in which it has an interest (e.g., for which it is maintaining a subscription), and deletes the session when it no longer has an interest in that resource. The attributes stored in the application session are typically the resource ID and type and the server ID. The flag indicating whether the server is the managing server for the resource as described above is set to indicate that server 112 is not the managing server for the resource.

As manager for the same resource in which both server 106 and server 112 have an interest, server 106 alone performs tasks in connection with the resource that would otherwise be performed by each of the servers in cluster 102 that has an interest in the resource. For example, without the present invention, each server in cluster 102 that manages a subscription regarding the same resource would separately subscribe to and periodically receive notifications of presence authorization rules throughout the life of any active sessions concerning the resource, such as from a rules server 114 via network 104. In the present invention, server 106 alone maintains a subscription for the presence authorization rules with rules server 114, and therefore server 106 alone receives the presence authorization rules from rules server 114. Server 106 may then provide the retrieved presence authorization rules to any other server listed in the resource record as an interested server. The interested servers are thus spared from retrieving the same data from rules server 114, thereby reducing the traffic to and from rules server 114, and from using memory and other resources that would otherwise be used by each of the interested servers. It may be noted that server 106 may provide the retrieved data using any known means, such as by sending the data to a server, or by writing the data to a shared database.

Subsequent to creating its SIP session for a subscription to a resource, client 100's session may be terminated, such as when the session expires or when client 100 sends a notification to server 106 to terminate the subscription. Server 106 removes the session from any associated resource list and/or decrements any associated resource counter as described above. If there are no more subscriptions for the resource being handled by server 106, server 106 accesses the record of the resource in resource table 108, and removes the identifier for server 106 from the 'interested servers' field in the record for the resource. Server 106 also preferably checks if there any other servers listed in the 'interested servers' field. If there are no other interested servers listed, server 106 preferably removes the record for the resource from table 108, deletes the application session it created for the resource, and ceases performing tasks related to managing the resource. However, if there are other interested servers still listed for the resource, then server 106 preferably maintains the application session it created for the resource and continues to serve as the manager for the resource as described above.

Subsequent to creating its SIP session for a subscription to the same resource, client 110's session may be likewise terminated. Server 112 removes the session from any associated resource list and/or decrements any associated resource counter as described above. If there are no more subscriptions for the resource being handled by server 112, server 112 accesses the record of the resource in resource table 108, removes the identifier for server 112 from the 'interested servers' field in the record for the resource, and deletes the application session it created for the resource. Server 112 also preferably determines whether the 'interested servers' field is now empty. If it is, server 112 preferably sends a message to the manager of the resource indicating that the 'interested servers' field for the resource is empty. Server 106 preferably checks the record for the resource in table 108 to make sure that no servers have been added to the 'interested servers' field in the interim, and removes the record for the resource from table 108. Server 106 then deletes the application session it created for the resource and ceases performing tasks related to managing the resource as described above.

Figure 3:
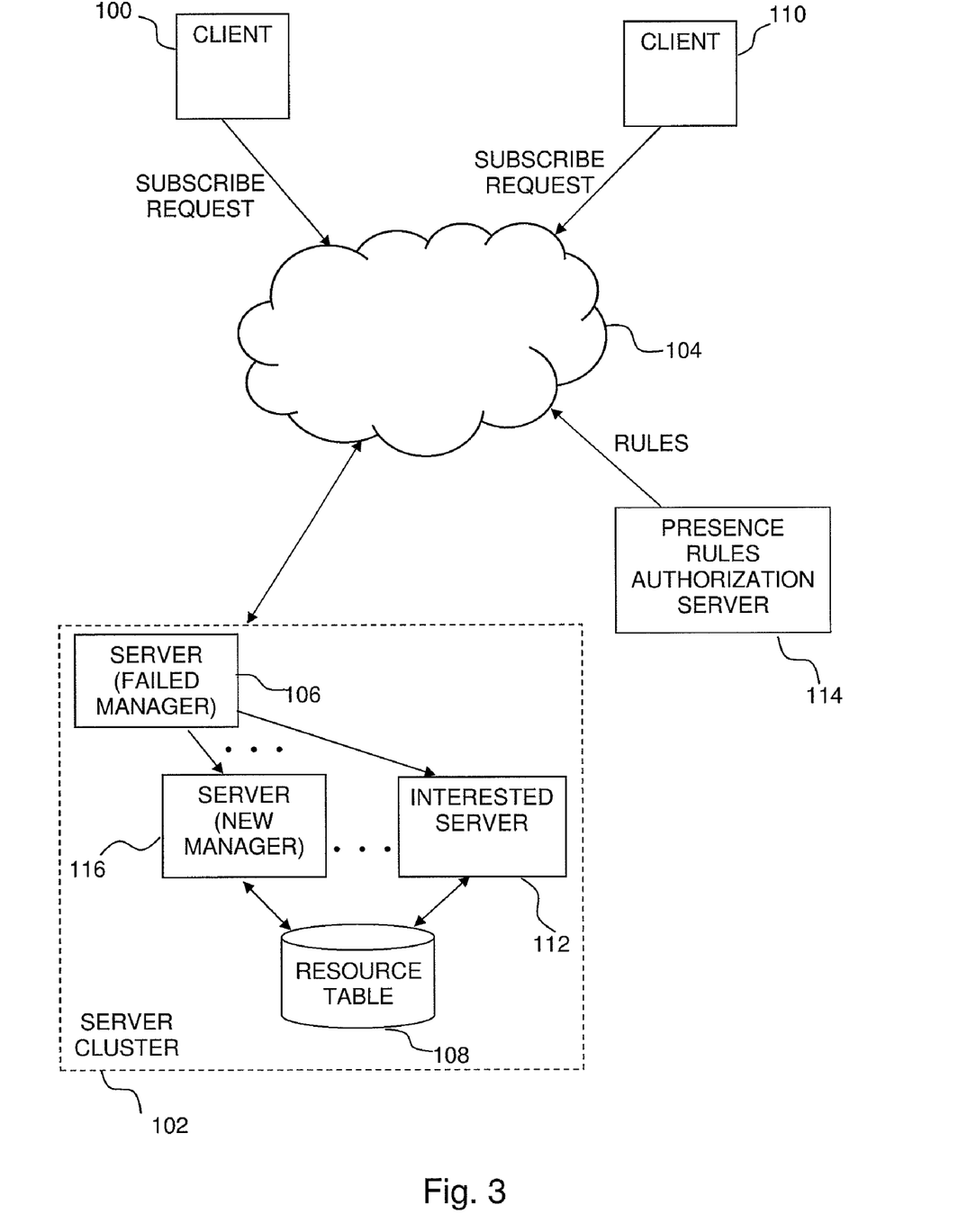
Figure 4A:
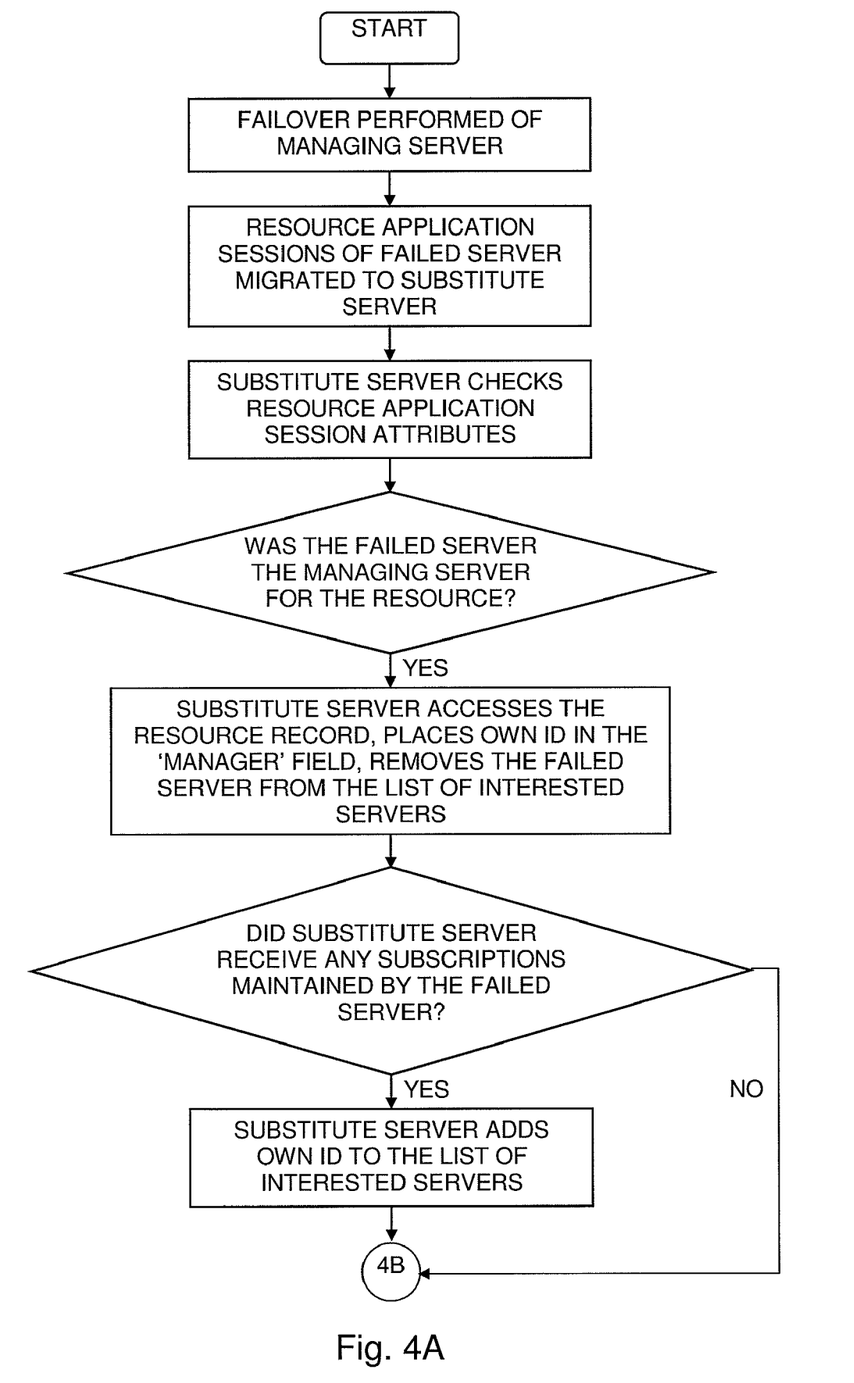
FIGS. 4A and 4B, taken together, is a simplified flowchart illustration of an exemplary method of operation of the system of FIG. 3 as regards failover operations, operative in accordance with embodiments of the present invention.
Figure 4B:
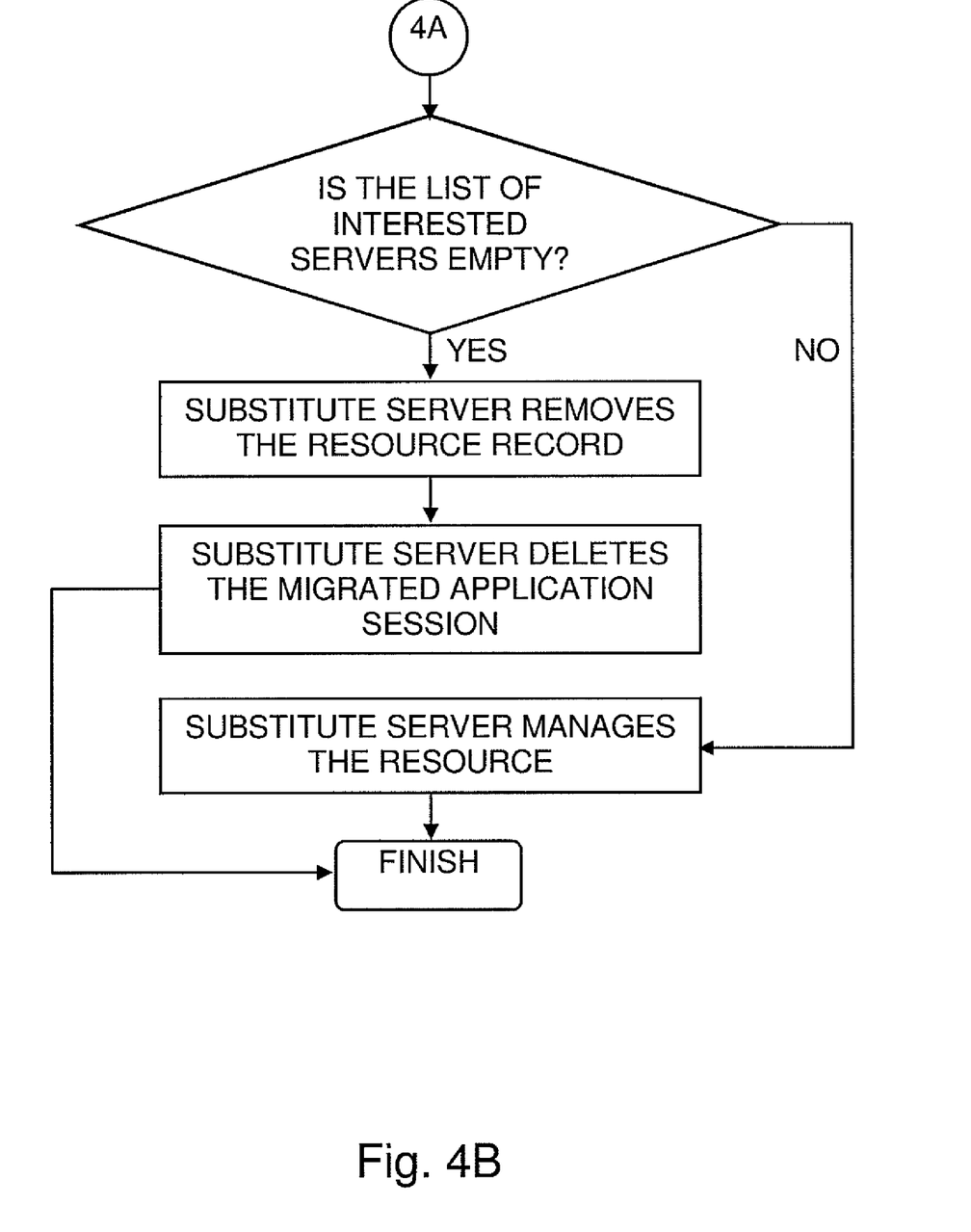

Reference is now made to FIG. 3, which is a simplified conceptual illustration of a server cluster with a common resource management, constructed and operative in accordance with an embodiment of the present invention, and additionally to FIGS. 4A and 4B which, taken together, is a simplified flowchart illustration of an exemplary method of operation of the system of FIG. 3 as regards failover operations, operative in accordance with embodiments of the present invention. The system of FIG. 3 is substantially similar to the system of FIG. 1 with the notable exception, that if server 106 fails, the responsibilities performed by server 106, including any subscriptions maintained by server 106 and the application sessions created by server 106 for any resources, are distributed among the operational servers within the cluster using conventional failover and load-balancing techniques. For example, upon failure of server 106, the application session created for the resource mentioned above is migrated to a substitute server 116, and server 116 is notified using conventional SIP failover protocols that the application session has been migrated to it. Server 116 preferably checks the attributes of the application session for the resource and determines that server 106 was the manager of the resource. Server 116 accesses the record for the resource in table 108, replaces the identifier for server 106 with its own identifier in the 'manager' field of the record, and removes the identifier of server 106 from the list of interested servers for the resource if server 106 is in the list. Independent from attending to the migrated application session, if any subscriptions for the resource were maintained by server 106 are migrated to server 116, then server 116 adds its own ID to the list of interested servers. If the list of interested servers is empty, server 116 preferably removes the record for the resource in table 108, deletes the application session for the resource that was migrated from server 106 to server 116 if it is otherwise no longer interested in the resource. Otherwise, server 116 manages the resource as described above for server 106.

Figure 5:
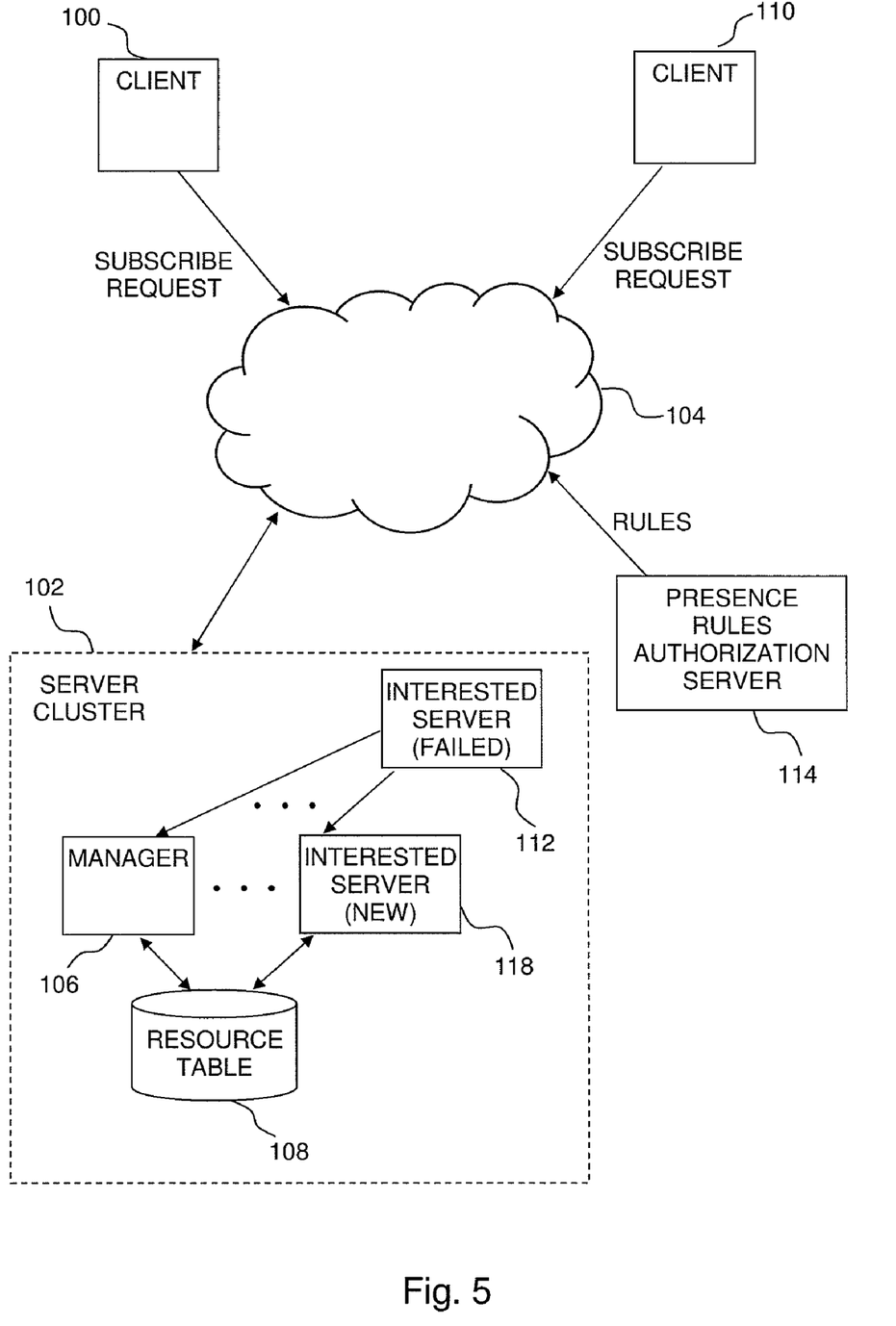
Figure 6A:
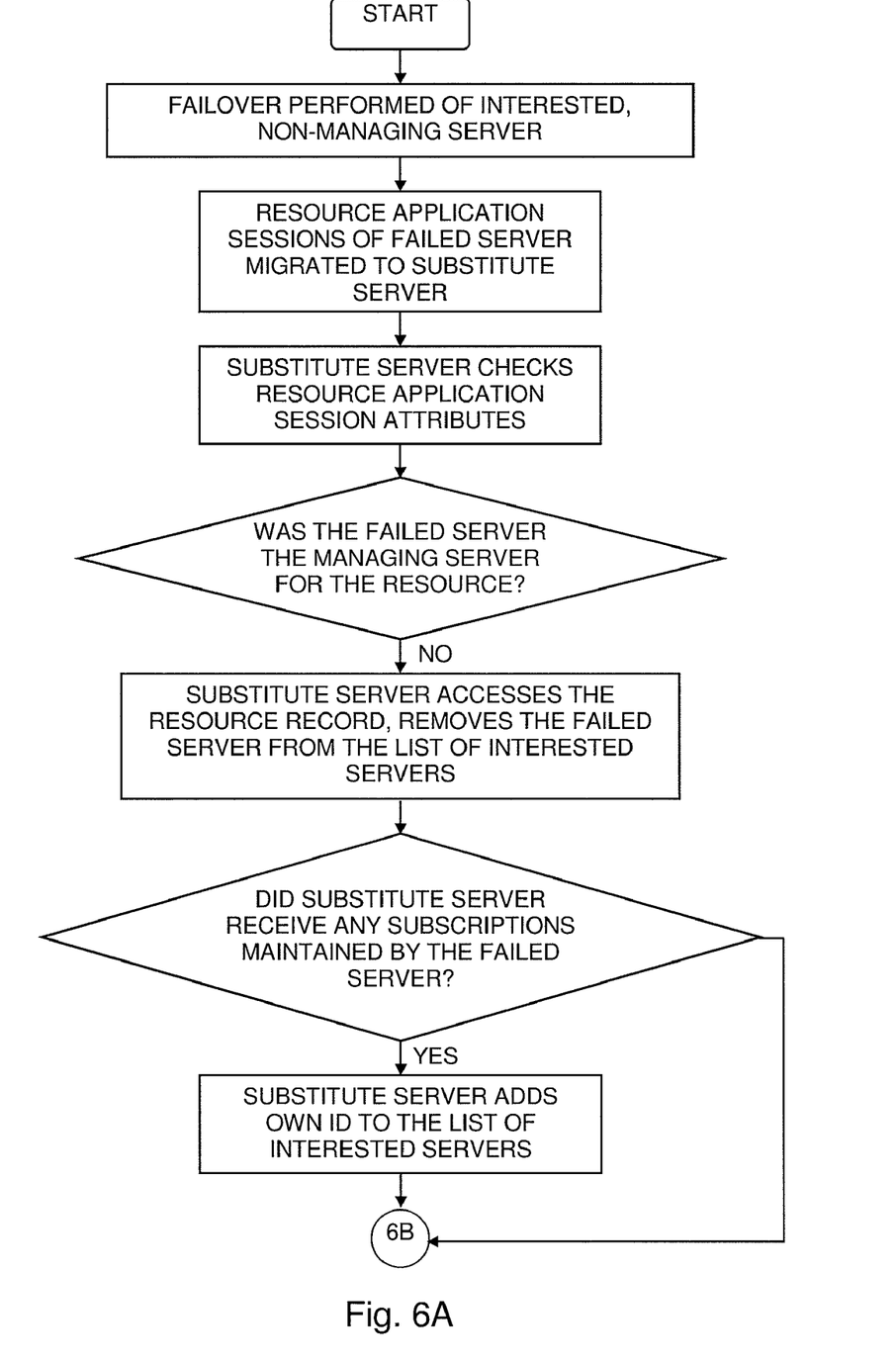
FIGS. 6A and 6B, taken together, is a simplified flowchart illustration of an exemplary method of operation of the system of FIG. 5 as regards failover operations, operative in accordance with embodiments of the present invention.
Figure 6B:
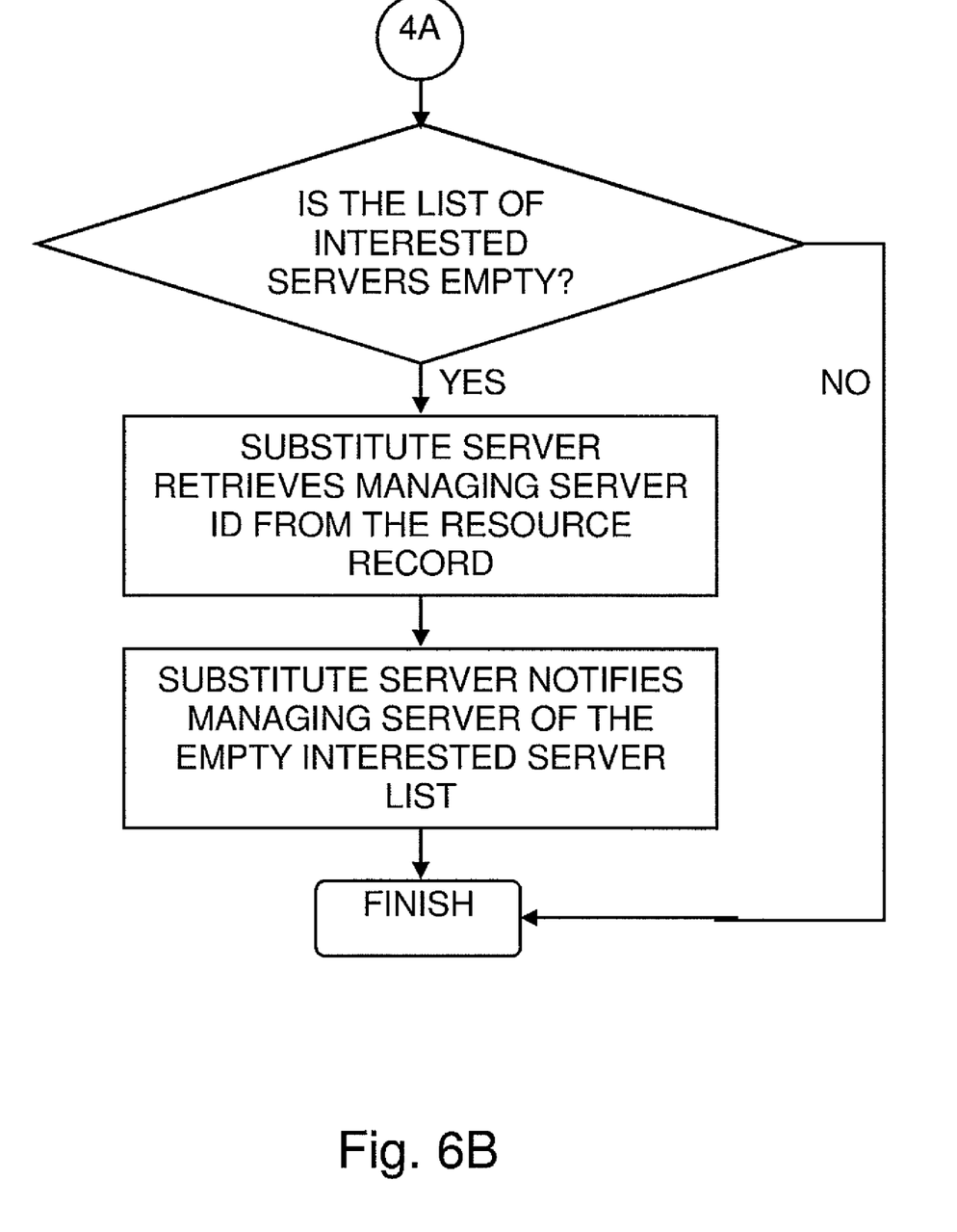

Reference is now made to FIG. 5, which is a simplified conceptual illustration of a server cluster with a common resource management, constructed and operative in accordance with an embodiment of the present invention, and additionally to FIGS. 6A and 6B which, taken together, is a simplified flowchart illustration of an exemplary method of operation of the system of FIG. 5 as regards failover operations, operative in accordance with embodiments of the present invention. The system of FIG. 5 is substantially similar to the systems of FIGS. 1 and 3 with the notable exception that if server 112 fails, the responsibilities performed by server 106, including any subscriptions maintained by server 112 and the application sessions created by server 112 for any resources, are distributed among the operational servers within the cluster using conventional failover and load-balancing techniques. For example, upon failure of server 112, the application session created for the resource mentioned above is migrated to a substitute server 118, and server 118 is notified using conventional SIP failover protocols that the application session has been migrated to it. Server 118 preferably checks the attributes of the application session for the resource and determines that server 112 was not the manager of the resource. Server 118 accesses the record for the resource in table 108 and removes the identifier of server 112 from the list of interested servers for the resource. Independent from attending to the migrated application session, if any subscriptions for the resource were maintained by server 112 are migrated to server 118, then server 118 adds its own ID to the list of interested servers. Server 118 deletes the application session for the resource that was migrated from server 112. If the list of interested servers is empty, server 118 retrieves the identifier from table 108 of the server managing the resource. Server 118 sends a notification to the managing server that the list of interested servers is empty. The managing server preferably checks the record for the resource in table 108 to make sure that no servers have been added to the 'interested servers' field in the interim, removes the record for the resource from table 108, and ceases performing tasks related to managing the resource as described above.

It may be noted that by using the mechanisms inherent in server cluster architecture, such as load-balancing and failover to nominate a server as a 'resource manager', the present invention offers a greater degree of efficiency when maintaining multiple subscriptions for a resource, while insuring an even distribution of management tasks among the servers in the cluster, as well as continued operation in the case of server failure. Network efficiency is improved as only resources with open requests are managed, and communication and information redundancy is reduced.

Although the present invention is described herein in the context of a cluster of server computers maintaining SIP/SIMPLE subscriptions to a resource, the present invention is applicable to any environment where multiple servers would otherwise perform redundant tasks with respect to a common resource.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for assigned resource management, the system comprising:
   a plurality of computer servers, each identifiable by an identifier; and
   a resource table stored on a computer-readable data storage medium and accessible to any of said servers,
   wherein any of said servers is configured to establish itself as manager for a resource, if no record in said resource table indicates that a manager exists for said resource, by including its identifier in a record in said resource table for said resource in a manner that indicates that said server is manager for said resource,
   wherein any of said servers is configured to include its identifier in a list of servers in said record for said resource that allows said manager to take at least one action regarding said resource on behalf of any of said servers in the list and said manager, and
   wherein said manager is configured to perform said action regarding said resource, thereby obviating the performance of said action by any other of said servers identified in said list.

2. A system according to claim 1 wherein said manager is configured to create said record for said resource in said resource table if a record does not exist for said resource in said resource table.

3. A system according to claim 1 wherein any of said servers is configured to include its identifier in said list of servers in said record for said resource that wish to participate in the performance by said manager of said at least one action regarding said resource where said server maintains at least one received client subscription for information regarding said resource.

4. A system according to claim 3 wherein any of said servers is configured to maintain a list of the resources for which it is currently maintaining received client subscriptions.

5. A system according to claim 3 wherein any of said servers is configured to maintain a resource counter for said resource that said server increments each time a new session is created for a received client subscription to said resource and decrements each time a session is terminated for a received client subscription to said resource.

6. A system according to claim 1 wherein said record includes a field identifying said resource, a field identifying said manager, and a field identifying said servers that wish to participate in the performance by said manager of said at least one action regarding said resource.

7. A system according to claim 1 wherein any of said servers is configured to create a SIP application session for each resource in which it has an interest and deletes said session when it no longer has an interest in said resource.

8. A system according to claim 7 wherein said application session includes an attribute that identifies a resource for which said session was created, an attribute that identifies said server that created said session, and an attribute that indicates whether said server that created said session is designated as manager for said resource.

9. A system according to claim 1 wherein said action is the retrieval of information regarding said resource.

10. A system according to claim 9 wherein said manager provides said information to any of said servers identified in said list.

11. A system according to claim 9 wherein said manager writes said information to a computer-readable data storage medium that is accessible to any of said servers identified in said list.

12. A system according to claim 1 wherein said manager is configured to cease acting as manager for said resource and remove said record from said resource table when said list of servers is empty.

13. A system according to claim 1 wherein any of said servers is configured to remove itself from said list if said server maintains no subscriptions for information regarding said resource and, if said list is empty, send a message to said manager notifying said manager that there are no longer servers interested in said resource.

14. A system according to claim 1 wherein any of said servers that is not manager of said resource is configured to establish itself as manager for said resource during failover of said manager by replacing said identifier of said manager in said record with its own identifier.

15. A method for assigned resource management, the method comprising:
   establishing a computer server from among a plurality of computer servers as manager for a resource, if no record in a resource table indicates that a manager exists for said resource, by including an identifier of said server in a record in said resource table for said resource in a manner that indicates that said server is manager for said resource;
   including an identifier of any of said servers in a list of servers in said record for said resource that allows said manager to take at least one action regarding said resource on behalf of any of said servers in the list and said manager; and
   said manager performing said action regarding said resource, thereby obviating the performance of said action by any other of said servers identified in said list.

16. A method according to claim 15 and further comprising creating said record for said resource in said resource table if a record does not exist for said resource in said resource table.

17. A method according to claim 15 wherein said including step comprises including where said server maintains at least one received client subscription for information regarding said resource.

18. A method according to claim 17 and further comprising maintaining at any of said servers a list of the resources for which said server is currently maintaining received client subscriptions.

19. A method according to claim 17 and further comprising maintaining at any of said servers a resource counter for said resource that said server increments each time a new session is created for a received client subscription to said resource and decrements each time a session is terminated for a received client subscription to said resource.

20. A method according to claim 15 and further comprising creating at any of said servers a SIP application session for each resource in which said server has an interest and deleting said session when said server no longer has an interest in said resource.

21. A method according to claim 15 wherein said performing step comprises retrieving information regarding said resource.

22. A method according to claim 21 wherein said performing step comprises providing said information to any of said servers identified in said list.

23. A method according to claim 21 wherein said performing step comprises writing said information to a computer-readable data storage medium that is accessible to any of said servers identified in said list.

24. A computer-implemented program embodied on a computer-readable device, the computer program comprising:

a code segment operative to establish a computer server from among a plurality Of computer servers as manager for a resource, if no record in a resource table indicates that a manager exists for said resource, by including an identifier of said server in a record in said resource table for said resource in a manner that indicates that said server is manager for said resource;

a code segment operative to include an identifier of any of said servers in a list of servers in said record for said resource that allow said manager to take at least one action regarding said resource on behalf of any of said servers in the list and said manager; and a code segment operative to performing said action at said manager regarding Said resource, thereby obviating the performance of said action by any other of said servers identified in said list.

25. A system according to claim 13, wherein when said message is sent to said manager, said manager checks said list to determine whether the list contains an identifier of any of said servers.

26. A system according to claim 25, wherein if said list does not contain an identifier of any of said servers, said manager removes said record for said resource from said resource table.

* * * * *